United States Patent
Osborn et al.

(10) Patent No.: US 8,010,124 B2
(45) Date of Patent: Aug. 30, 2011

(54) METHODS, SYSTEMS AND COMPUTER PROGRAM PRODUCTS FOR PROVIDING LOCATION DETERMINATION INFORMATION TO AN ASSISTED LOCATION SERVICE

(75) Inventors: William R. Osborn, Cary, NC (US); Leland S. Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 2604 days.

(21) Appl. No.: 10/395,838

(22) Filed: Mar. 24, 2003

(65) Prior Publication Data
US 2004/0192345 A1    Sep. 30, 2004

(51) Int. Cl.
*H04W 24/00* (2009.01)
(52) U.S. Cl. ............... 455/456.1; 455/456.5; 455/426.1
(58) Field of Classification Search ............... 455/456, 455/457; 379/93.05, 211.02, 201.01, 88.17
See application file for complete search history.

(56) References Cited

U.S. PATENT DOCUMENTS

| | | | |
|---|---|---|---|
| 4,445,118 A | 4/1984 | Taylor et al. | 343/357 |
| 4,457,006 A | 6/1984 | Maine | 375/87 |
| 4,601,005 A | 7/1986 | Kilvington | 364/602 |
| 4,701,934 A | 10/1987 | Jasper | 375/1 |
| 4,785,463 A | 11/1988 | Jane et al. | 375/1 |
| 4,797,677 A | 1/1989 | MacDoran et al. | 342/352 |
| 4,894,842 A * | 1/1990 | Broekhoven et al. | 375/150 |
| 4,959,656 A | 9/1990 | Kumar | 342/418 |
| 4,998,111 A | 3/1991 | Ma et al. | 342/352 |
| 5,043,736 A | 8/1991 | Darnell et al. | 342/357 |
| 5,119,102 A | 6/1992 | Barnard | 342/357 |
| 5,153,598 A | 10/1992 | Alves, Jr. | 342/352 |
| 5,202,829 A | 4/1993 | Geier | 364/449 |
| 5,223,844 A | 6/1993 | Mansell et al. | 342/357 |
| 5,225,842 A | 7/1993 | Brown et al. | 342/357 |
| 5,245,634 A | 9/1993 | Averbuch | 375/108 |
| 5,271,034 A | 12/1993 | Abaunza | 375/1 |

(Continued)

FOREIGN PATENT DOCUMENTS
DE       4424412       1/1996
(Continued)

OTHER PUBLICATIONS

International Search Report for PCT/IB2004/000149 mailing date May 12, 2004.

(Continued)

*Primary Examiner* — Curtis Kuntz
*Assistant Examiner* — Karen L Le
(74) *Attorney, Agent, or Firm* — Myers Bigel Sibley & Sajovec, P.A.

(57) ABSTRACT

Systems for providing location determination information to an assisted location service associated with a wireless communication network include a satellite positioning system receiver that generates a set of first format location information based on measurements of signals transmitted from positioning system satellites. A conversion circuit of the system, separate from the satellite positioning system receiver, is configured to receive the set of first format location information from the satellite positioning system receiver and to convert the set of first format location information to a second format, different from the first format to provide the location determination information. The system further includes a transmitter configured to transmit the location determination information to the assisted location service over the wireless communication network. Methods and computer program products for providing location determination information to an assisted location service associated with a wireless communication network are also provided.

57 Claims, 6 Drawing Sheets

U.S. PATENT DOCUMENTS

| | | | |
|---|---|---|---|
| 5,311,194 A | 5/1994 | Brown | 342/357 |
| 5,317,323 A | 5/1994 | Kennedy et al. | 342/357 |
| 5,323,163 A | 6/1994 | Maki | 342/357 |
| 5,323,322 A | 6/1994 | Mueller et al. | 364/449 |
| 5,365,450 A | 11/1994 | Schuchman et al. | 364/449 |
| 5,379,047 A | 1/1995 | Yokev et al. | 342/457 |
| 5,379,224 A | 1/1995 | Brown et al. | 364/449 |
| 5,379,320 A | 1/1995 | Fernandes et al. | 375/1 |
| 5,416,797 A | 5/1995 | Gilhousen et al. | 375/705 |
| 5,418,538 A | 5/1995 | Lau | 342/357 |
| 5,420,592 A | 5/1995 | Johnson | 342/357 |
| 5,430,759 A | 7/1995 | Yokev et al. | 375/202 |
| 5,448,773 A | 9/1995 | McBurney et al. | 455/343 |
| 5,483,549 A | 1/1996 | Weinberg et al. | 375/200 |
| 5,491,486 A | 2/1996 | Welles et al. | 342/357 |
| 5,663,734 A | 9/1997 | Krasner | 342/357 |
| 5,663,735 A | 9/1997 | Eshenbach | 342/357 |
| 5,812,087 A | 9/1998 | Krasner | 342/357 |
| 6,075,987 A | 6/2000 | Camp, Jr. et al. | 455/427 |
| 6,188,351 B1 | 2/2001 | Bloebaum | 342/357.15 |
| 6,204,808 B1 | 3/2001 | Bloebaum et al. | 342/357.07 |
| 6,252,543 B1 | 6/2001 | Camp | 342/357.06 |
| 6,295,023 B1 | 9/2001 | Bloebaum | 342/357.06 |
| 6,323,803 B1 | 11/2001 | Jolley et al. | 342/357.03 |
| 6,389,291 B1 | 5/2002 | Pande et al. | 455/456 |
| 6,415,154 B1 * | 7/2002 | Wang et al. | 455/456.1 |
| 6,433,734 B1 | 8/2002 | Krasner | 342/357.09 |
| 6,433,735 B1 | 8/2002 | Bloebaum et al. | 342/357.1 |
| 6,535,815 B2 | 3/2003 | Bloebaum | 701/213 |
| 6,774,842 B2 * | 8/2004 | Syrjarinne | 342/357.13 |
| 2002/0168988 A1 * | 11/2002 | Younis | 455/456 |
| 2003/0008663 A1 | 1/2003 | Stein et al. | 455/456 |
| 2006/0034350 A1 * | 2/2006 | Nielsen | 375/147 |

FOREIGN PATENT DOCUMENTS

| | | |
|---|---|---|
| EP | 0 444 738 | 9/1991 |
| EP | 0 447 978 | 9/1991 |
| GB | 2 273 218 | 6/1994 |
| GB | 2 308 033 | 6/1997 |
| WO | 94/28434 | 12/1994 |
| WO | 96/15636 | 5/1996 |
| WO | 97/14049 | 4/1997 |

OTHER PUBLICATIONS

Written Opinion of the International Searching Authority for PCT/IB2004/0001.

* cited by examiner

METHODS, SYSTEMS AND COMPUTER PROGRAM PRODUCTS FOR PROVIDING LOCATION DETERMINATION INFORMATION TO AN ASSISTED LOCATION SERVICE

BACKGROUND OF THE INVENTION

The present invention relates to the field of communications in general and more particularly, to determining the position of a mobile terminal device.

Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

It is desirable, and in certain places mandated by law, that mobile telecommunication network providers be able to determine an approximate geographical location of a mobile terminal (MT), such as, for example, an actively communicating cellular telephone.

A variety of MT location techniques have been proposed. These location techniques include uplink signal location, downlink signal location, Global Positioning System (GPS) based approaches, assisted GPS approaches combining communication signals and GPS signals and approaches based on digital television signals. For "uplink signal" location techniques, the mobile telecommunications network is typically configured to determine where the MT is located based on ranging measurements associated with one or more uplink signals. These uplink signals are transmitted by the MT and received by a number of receivers having known locations, such as, for example, cellular telephone base stations (BSs). For the "downlink signal" location techniques, the mobile telecommunications network is typically configured to determine where the MT is located based on ranging measurements associated with the reception, by the MT, of downlink signals from a number of transmitters having known locations.

FIG. 1 illustrates a conventional terrestrial mobile (wireless) telecommunications network 20 that may implement any one of a variety of known wireless communications standards including uplink and downlink signals. The wireless network may include one or more wireless mobile stations 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile stations 22.

The cells 24 generally serve as nodes in the network 20, from which links are established between wireless mobile stations (terminals) 22 and a MTSO 28, by way of the base stations 26 servicing the cells 24. Each cell 24 will have allocated to it one or more dedicated control channels and one or more traffic channels. The control channel is a dedicated channel that may be used for downlink transmission (network to mobile) of cell identification and paging information. The traffic channels carry the voice and data information. Through the network 20, a duplex (downlink and uplink) radio communication link 30 may be effected between two wireless mobile stations 22 or between a wireless mobile station 22 and a landline telephone user 32 via a public switched telephone network (PSTN) 34. The function of the base station 26 is commonly to handle the radio communications between the cell 24 and the wireless mobile station 22. In this capacity, the base station 26 functions chiefly as a relay station for data and voice signals. It is also know to provide mobile telecommunications networks in which the base stations are satellites, having associated coverage areas, rather than terrestrial base stations.

The GPS location approach generally uses location services not associated with either the uplink or downlink signals used in the mobile telecommunications network. In a typically GPS application, the GPS receivers collect and analyze ranging measurements from signals transmitted by GPS satellites having known locations.

As illustrated in FIG. 2, GPS is a space-based triangulation system using satellites 42 and GPS control computers 48 to measure positions anywhere on the earth. GPS was first developed by the United States Department of Defense as a navigational system. The advantages of this navigational system over land-based systems are that it is not limited in its coverage, it provides continuous 24-hour coverage, which may be highly accurate regardless of weather conditions. In operation, a constellation of 24 satellites 42 orbiting the earth continually emit a GPS radio signal 44. A GPS receiver 46, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 46 through a process of triangulation. It is known to include a GPS receiver 46 in a mobile station 22 to provide position location functionality to the mobile station 22.

The startup of a GPS receiver typically requires the acquisition of a set of navigational parameters from the navigational data signals of four or more GPS satellites. This process of initializing a GPS receiver may often take several minutes. The duration of the GPS positioning process is directly dependent upon how much information a GPS receiver has initially. Most GPS receivers are programmed with almanac data, which coarsely describes the expected satellite positions for up to one year ahead. However, if the GPS receiver does not have some knowledge of its own approximate location, then the GPS receiver may not be able to find or acquire signals from the visible satellites quickly enough, and, therefore, cannot calculate its position quickly. Furthermore, it should be noted that a higher signal strength is typically needed for capturing the C/A Code and the navigation data at start-up than is needed for continued monitoring of an already-acquired signal. It should also be noted that the process of monitoring the GPS signal may be significantly affected by environmental factors. Thus, a GPS signal which may be easily acquired in the open typically becomes harder to acquire when a receiver is under foliage, in a vehicle or in a building.

Recent governmental mandates, e.g., the response time requirements of the FCC Phase II E-911 service, make it imperative that the position of a mobile handset be determined accurately and in an expedited manner. Thus, in order to implement a GPS receiver effectively within a mobile terminal while also meeting the demands for fast and accurate positioning, it has become desirable to be able to quickly provide mobile stations with accurate assistance data, e.g., local time and position estimates, satellite ephemeris and clock information, and visible satellite list (which generally varies with the location of the mobile station). The use of such assistance data can permit a GPS receiver that is integrated with or connected to a mobile station to expedite the completion of its start-up procedures. It is, therefore, desirable to be able to send the necessary GPS assistance information over an existing wireless network to a GPS receiver that is integrated with or connected to a mobile station.

Taylor et al., U.S. Pat. No. 4,445,118, discusses the concept of aiding or assisting GPS receivers. The method described uses a single transmitter, such as a geosynchronous satellite, to provide a single assistance message for a wide geographical area. The assistance message data includes a list of GPS satellites in view, the respective satellite positions, and predicted Doppler shifts on the satellite signals. This structure of this message permits the position computation function (PCF) to be done in the user receiver.

Krasner, U.S. Pat. No. 5,663,734, describes another GPS receiver approach. The patent is mainly related to the receiver architecture, but discusses how the receiver performance can be improved by assistance. The patent mentions "data representative of ephemeris" and expected Doppler shifts as possible contents of the assistance message.

Lau, U.S. Pat. No. 5,418,538, describes a system and method for aiding a remote GPS/GLONASS receiver by broadcasting "differential" information from a like receiver in a "reference station." The reference station broadcasts a visible satellite list and also the associated ephemeris, in one embodiment. The advantages to the remote receiver may be three-fold: reduced memory requirements, lower-cost frequency reference, and faster acquisition. The discussion describes the benefit of being able to estimate and remove the Doppler due to the receiver clock inaccuracy after acquiring the first satellite.

Eshenbach, U.S. Pat. No. 5,663,735, describes a method whereby a GPS receiver derives an accurate absolute time reference from a radio signal. Optionally, the receiver also derives from the radio signal a frequency reference that is more accurate than the inexpensive crystal oscillator contained in the receiver. The GPS receiver performs the position calculation, and therefore must have the absolute time as well as the ephemeris and clock corrections for the GPS satellites.

Another assisted-GPS standard for GSM-based networks is described in specification numbers 3GPP TS 04.31 and 3GPP TS 03.71. This standard is based on placing reference GPS receivers at various nodes in the network, capturing the ephemeris information from these receivers, then providing this information along with a list of visible satellites to all handset-based GPS receivers via messages on GSM downlink bearers. The benefit of this approach is that it allows the handset-based GPS receiver to be fully functional, i.e., it contains the PCF and also can operate in continuous navigation mode.

One particularly challenging, but important, component for which assistance would be beneficial is obtaining accurate GPS timing information at the GPS receiver. Traditionally, GPS receivers demodulate the required timing information from the messages broadcast by the GPS satellites. However, reasonably error free demodulation of such signals may not be possible below a certain signal threshold, which itself may be significantly higher than the minimum signal level required for tracking already acquired signals and making range measurements. Accordingly, where GPS receiver operation is desirable under conditions of low-signal operation (for example, due to environmental attenuation, antenna compromises or other affects) it may not be possible to rely on demodulation of the transmitted information from the GPS satellites as a source of GPS timing information.

As noted above, one previously proposed approach is the provision of assistance information from a cellular network to the combined GPS and cellular receiver. Three different techniques for providing such GPS timing information through network assistance have previously been proposed. First, some networks are synchronized by GPS. An example is the IS-95 Code Divisional Multiple Access (CDMA) system that, as a result, has an implicit timing relationship between the air-interface timing (i.e. the spreading codes) of the communication network and GPS timing. Therefore, once a GPS-equipped mobile terminal (GPS-MT) synchronizes with the communication network air-interface it is expected to also have accurate GPS timing that can be used to improve the sensitivity and time-to-first-fix (TTFF) of the GPS receiver in the device. This approach is only useful, however, for communication networks, such as IS-95 CDMA, which have such an implicit timing relationship.

One approach proposed for networks that are not so GPS-synchronized is to establish a relationship between GPS timing and a communication network's air-interface timing at each cell transmitter (base station) of the communication network by provision of an observer unit equipped with a GPS receiver as well as a cellular receiver. This timing relationship information can then be reported to a GPS assistance server of the communication network and thereby included in assistance messages sent to GPS-MT devices being serviced by the respective base station of the communication network. Accordingly, once a GPS-MT device synchronizes with the air-interface timing of its serving cell of the communication network and receives this timing assistance, it may determine the current GPS timing accurately. Systems incorporating this second approach are described in U.S. Pat. No. 6,240,808 entitled Method and System for Aiding GPS Receivers Via a Cellular or PCS Network.

A third approach that may be applied to unsynchronized networks without a GPS observer unit (also referred to as a Location Measurement Unit (LMU)) at each base station location is described in U.S. Pat. No. 5,812,087 entitled Method and Apparatus for Satellite Positioning System Based Time Measurement. In this approach, the timing information is derived from samples of the navigation signal from multiple GPS satellites. For example, GPS-MT device may make measurements on the ranging codes of multiple GPS satellite signals and also sample some duration of the navigation data that is imposed on these codes. This data may then be returned to a server where the navigation data samples may be matched to the samples of a reference signal to estimate the time at which the other measurements were made.

Another approach to a reduced complexity GPS location service to satisfy governmental mandates for FCC Phase II E-911 service provides only a simplified, GPS receiver in the MT, rather than a full function autonomous GPS receiver. An assisted location service 36 (FIG. 1) associated with the communication network then is used to calculate the position of the MT. Such an approach is specified in the TIA/EIA/IS-801-1 specification (IS-801), which is implemented in the GPSOne protocol assisted location service available from SnapTrack Inc, a Qualcomm Company, as described at the website http://www.snaptrack.com.

A GPSOne compatible receiver (i.e. located in the mobile terminal) generally performs all GPS satellite acquisition functions and then sends measurements to a centralized location server of a CDMA network serving the mobile terminal. The raw measurements, as specified by IS-801, include code phase, measurement time and signal quality parameters. By generating only intermediate navigation data at the GPSOne compatible receiver, some of the burden of performing positioning calculations may be shifter to the location server. Thus, a GPSOne compatible receiver is structured to output intermediate raw measurements as contrasted with a full function autonomous GPS receiver that generally does not output such intermediate raw measurements.

While such a reduced capability receiver may be satisfactory for meeting E-911 requirements to provide position location information for a MT that are accessible at the communications network, a GPSOne type receiver typically does not provide the actual position information at the mobile terminal. Such positione information would generally need to be computed at the location server and then be transmitted back to the MT. The round-trip delay for such an approach to providing positioning information would generally not meet location application requirements for rapid access to repetitive position fixes, a capability which is supported by autonomous full function GPS receivers coupled to the MT. One approach to such systems would be to provide both an IS-801 compatible receiver to meet the E-911 position requirements along with a distinct, autonomous GPS receiver that provides rapid access to repetitive position fixes.

SUMMARY OF THE INVENTION

Embodiments of the present invention include systems for providing location determination information to an assisted location service associated with a wireless communication network. The system includes a satellite positioning system receiver that generates a set of first format location information based on measurements of signals transmitted from positioning system satellites. A conversion circuit of the system, separate from the satellite positioning system receiver, is configured to receive the set of first format location information from the satellite positioning system receiver and to convert the set of first format location information to a second format, different from the first format to provide the location determination information. The system further includes a transmitter configured to transmit the location determination information to the assisted location service over the wireless communication network. The satellite positioning system receiver may be a full function autonomous global positioning system (GPS) receiver and the assisted location service may be an IS-801 compatible service.

In further embodiments of the present invention, the satellite positioning system receiver is a full function autonomous global positioning system (GPS) receiver and the assisted location service is a TIA/EIA/IS-801-1 compatible service. The system may be included in a mobile terminal.

In other embodiments of the present invention, the set of first format location information includes Euclidian space location information for at least one of the positioning system satellites. The conversion circuit is configured to convert the Euclidian space location information to signal space location information to provide the location determination information. The Euclidian space location information may be a pseudo-range to at least one of the positioning system satellites and the signal space location information may be a code phase in chips.

In further embodiments of the present invention, the satellite positioning receiver is configured to determine a time of measurement in satellite positioning system (SPS) time for a received signal from at least one of the positioning system satellites. The conversion circuit is configured to convert the measurement time in SPS time to wireless communication network time to provide the location determination information. The system may further include a receiver that receives wireless communication network time information over the wireless communication network and the conversion circuit may be configured to convert the measurement time in SPS time to wireless communication network time based on received wireless communication network time information. The wireless communication network may be a code division multiple access (CDMA) system and the received wireless communication network time information may be a number of leap seconds added to a universal time clock since a reference time. The conversion circuit may be configured to subtract the number of leap seconds from GPS time to provide the location determination information.

In other embodiments of the present invention, methods are provided for providing location determination information to an assisted location service associated with a wireless communication network. A set of first format location information based on measurements of signals transmitted from positioning system satellites is received from a full function autonomous SPS receiver. The set of first format location information is converted to a second format, different from the first format, external to the full function autonomous SPS receiver to provide the location determination information. The location determination information is transmitted to the assisted location service over the wireless communication network.

In further embodiments of the present invention the set of first format location information includes Euclidian space location information and the Euclidian space location information is converted to signal space location information to provide the location determination information. The Euclidian space location information may include a pseudo-range to at least one of the positioning system satellites and the signal space location information may be a code phase in chips.

In other embodiments of the present invention, the pseudo-range is in meters and converting the pseudo-range to a code phase in chips includes dividing the pseudo-range by the speed of light to provide a quotient. The quotient is multiplied by one thousand to provide a product having an integer part and a fractional part. The fractional part of the product is multiplied by 1023 to provide the code phase in chips. The code phase in chips may have an integer part and a fractional part and transmitting the location determination information may include transmitting the integer part of the code phase as a first parameter and the fractional part of the code phase as a second parameter over the wireless communication network.

In further embodiments of the present invention the method further includes determining a measurement time in SPS time for a received signal from at least one of the positioning system satellites. The measurement time in SPS time is converted to wireless communication network time to provide further location determination information. Wireless communication network time information may be received over the wireless communication network and converting the measurement time information may include converting the measurement time in SPS time to wireless communication network time based on the received wireless communication network time information. The wireless communication network may be a code division multiple access (CDMA) system and converting the measurement time may include subtracting a number of leap seconds added to a universal time clock since a reference time from GPS system time.

In other embodiments of the present invention, methods are provided for providing location determination information to an assisted location service associated with a wireless communication network. Euclidian space location information is determined based on measurements of signals transmitted from positioning system satellites. The Euclidian space location information is converted to signal space location information to provide the location determination information. The location determination information is transmitted to the assisted location service over the wireless communication network.

Computer program products for providing location determination information to an assisted location service associated with a wireless communication network are also provided.

DETAILED DESCRIPTION

Figure 1:
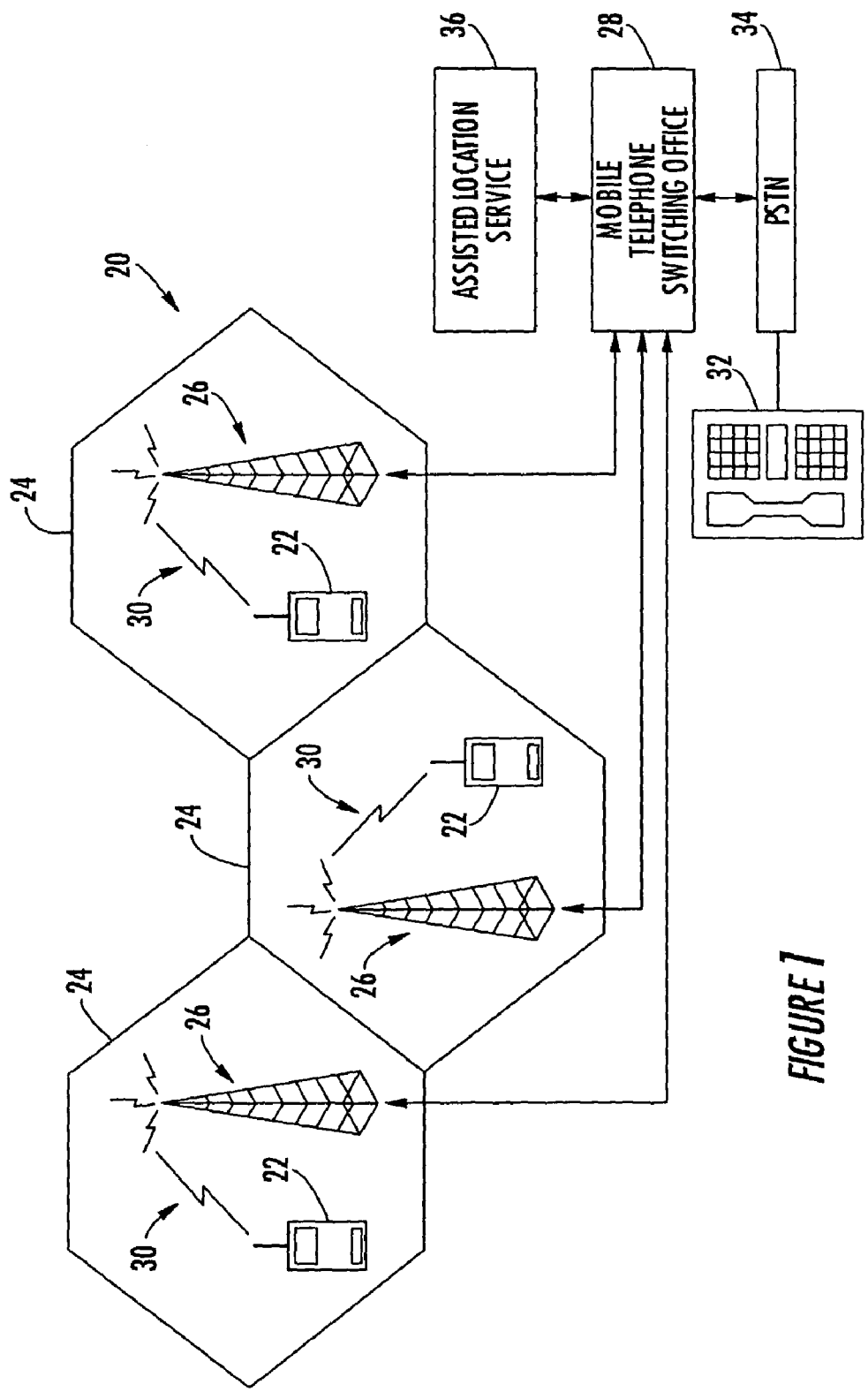
FIG. 1 is a schematic block diagram illustrating a conventional terrestrial wireless communication system.
Figure 2:
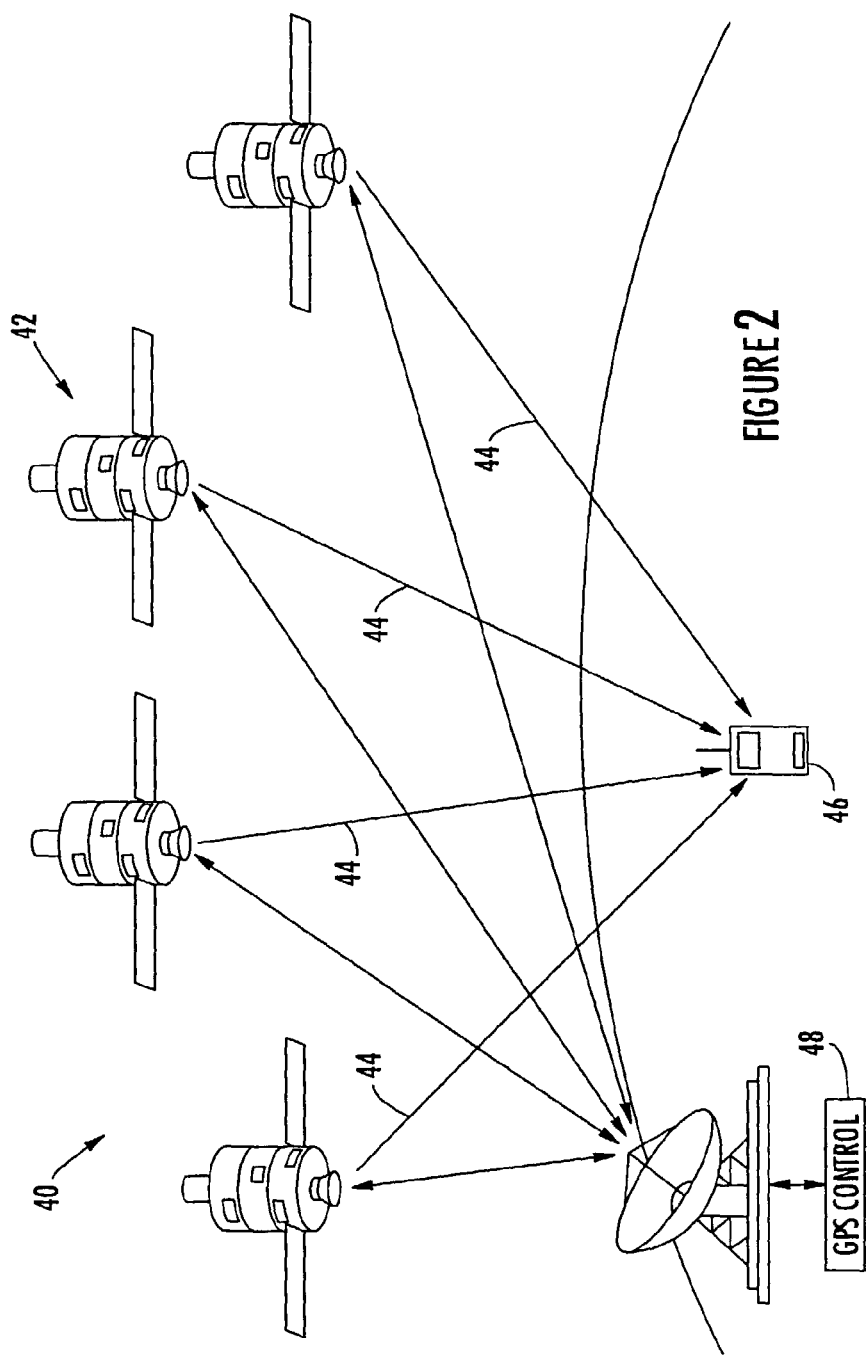
FIG. 2 is schematic block diagram illustrating a GPS system.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, system circuit, mobile terminal or computer program product. Accordingly, the present invention may take the form of an entirely hardware embodiment, an entirely software embodiment or an embodiment combining software and hardware aspects, all generally referred to herein as a "circuit."

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

By way of background, for the GPS location technique, as discussed above, the positions of the GPS satellites vary with regard to time. Thus, a GPS receiver generally needs to know the positions of the GPS satellites at the time of the ranging measurements. The ranging measurements between an autonomous GPS receiver and each of at least four (4) GPS satellites generally occur by: 1) finding the starting point on the 1023 chip long C/A sequence within the signal transmitted by each GPS satellite; 2) finding the start time of a bit edge; and 3) finding the start time of the data message. The resulting "time of flight" for the signal received from each GPS satellite is then converted to a distance range from the receiver to the satellite (i.e., Euclidian space location information, generally in meters). The resulting four (4) range measurements allow for a solution to the GPS receiver's position in x, y and z coordinates and for determination of the unknown time difference between the GPS time and the GPS receiver's independent clock. Thus, internal to the GPS receiver signal space information is obtained (from the received signals) and processed to provide a range information and/or position as an output of the autonomous GPS receiver. Further discussion of mathematical solutions suitable for use with some assisted GPS type systems is provided in U.S. Pat. No. 6,252,543.

Figure 3:
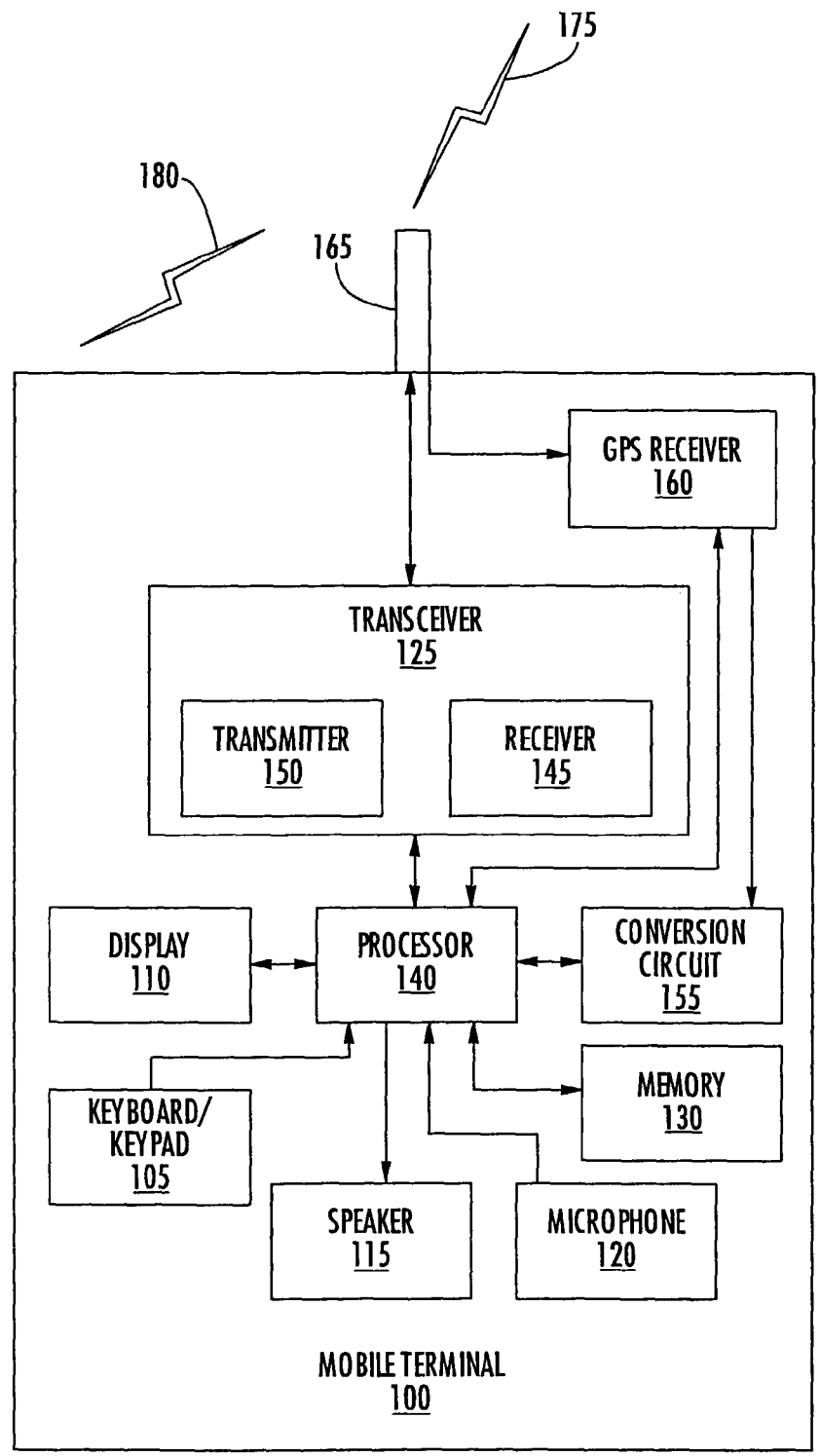
FIG. 3 is a schematic block diagram illustrating a mobile terminal including a system for providing location determination information according some to embodiments of the present invention.

Embodiments of the present invention will now be further described with reference to the schematic block diagram illustration of a mobile terminal 100 in FIG. 3. FIG. 3 illustrates a mobile wireless terminal 100, a GPS signal 175 and a wireless communication network signal 180. The mobile terminal 100 may comprise a keyboard/keypad 105, a display 110, a speaker 115, a microphone 120, a network transceiver 125, and a memory 130 that communicate with a processor 140. The network transceiver 125 typically comprises a transmitter circuit 150 and a receiver circuit 145, which respectively transmit outgoing radio frequency signals to a base station 26 of the wireless communication network and receive incoming radio frequency signals from the base station 26 via an antenna 165. While a single antenna 165 is shown in FIG.

3, it is to be understood that multiple antennas and/or different types of antennas may be utilized based on the types of signals being received. The radio frequency signals transmitted between the mobile terminal 100 and the base station 26 may comprise both traffic and control signals (e.g., paging signals/messages for incoming calls), which are used to establish and maintain communication with another party or destination, and may provide uplink and/or downlink communications. However, the present invention is not limited to such two-way communication systems.

The foregoing components of the mobile terminal 100 may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Also shown in the mobile terminal 100 of FIG. 3 is a conversion circuit 155 and a full function autonomous GPS receiver 160. The conversion circuit 155, which may alternately be implemented as code executing on the processor 140, is configured to receive location information in a first format, such as Euclidian space location information, from a SPS receiver, such as a GPS receiver 160, and to convert that information to a different format, such as signal space location information (e.g. code phase). The GPS receiver 160, alone or in cooperation with the processor 140, provides a processing circuit configured to receive ranging signals from GPS satellites 42 and to generate the Euclidian space location information as described above and provide the same to the conversion circuit 155.

It is further to be understood that the network transceiver 125, as shown in FIG. 3, may include a transmitter 150 allowing the network transceiver 125 to support signal processing for transmitting location determination information generated by the conversion circuit 155 from the mobile terminal 100 to a base station 26 (FIG. 1) that is operatively associated with an assisted location service 36 configured to calculate a position of the mobile terminal 100, such as a GPSOne platform. The assisted location service may be implemented in a base station 26, a MTSO 28, or other component communicatively coupled to the mobile telecommunications network 20 and need not be a separate server 36 as illustrated in FIG. 1.

In various embodiments of the present invention as illustrated in FIG. 3, timing information conversion is also provided to support requirements of an assisted location service having a format that differs from the normal output format of an autonomous GPS receiver, such as the GPS receiver 160. In such embodiments, the GPS receiver 160 is configured to determine a measurement time in SPS time (i.e., GPS time for the illustrated embodiments of FIG. 3) for a received signal from at least one of the positioning system satellites 42. More particularly, a measurement time is presented by the GPS receiver as associated with particular Euclidian space location information generated by the GPS receiver 160 and provided to the conversion circuit 155. The conversion circuit 155, in such embodiments, is further configured to convert the measurement time in GPS time to wireless communication network time to provide additional location determination information for transmission by the transmitter 150 to an assisted location service 36 (FIG. 1) associated with the wireless communication network 20. In particular embodiments, the timing conversion utilizes wireless communication network time information received by the receiver 145 from the wireless communication network 20.

Figure 4:
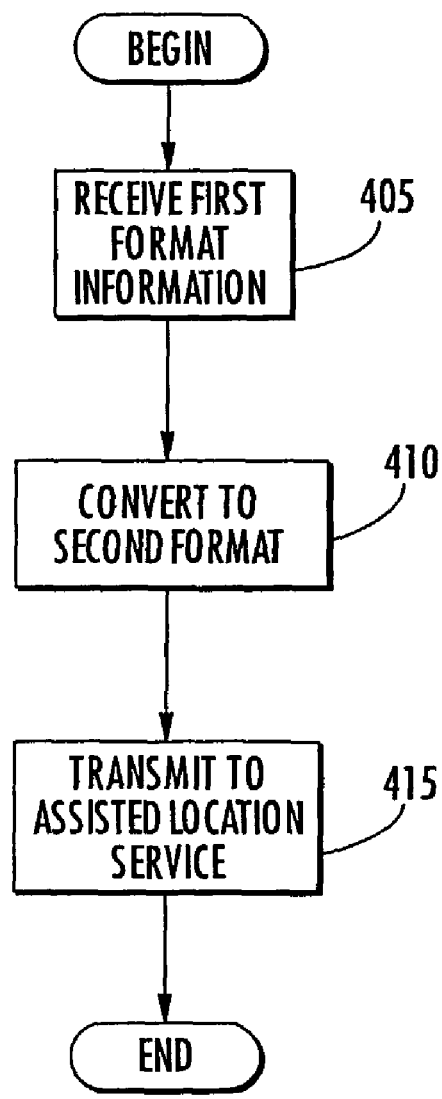
FIG. 4 is a flow chart illustrating operations for providing location determination information to an assisted location service according to some embodiments of the present invention.
Figure 5:
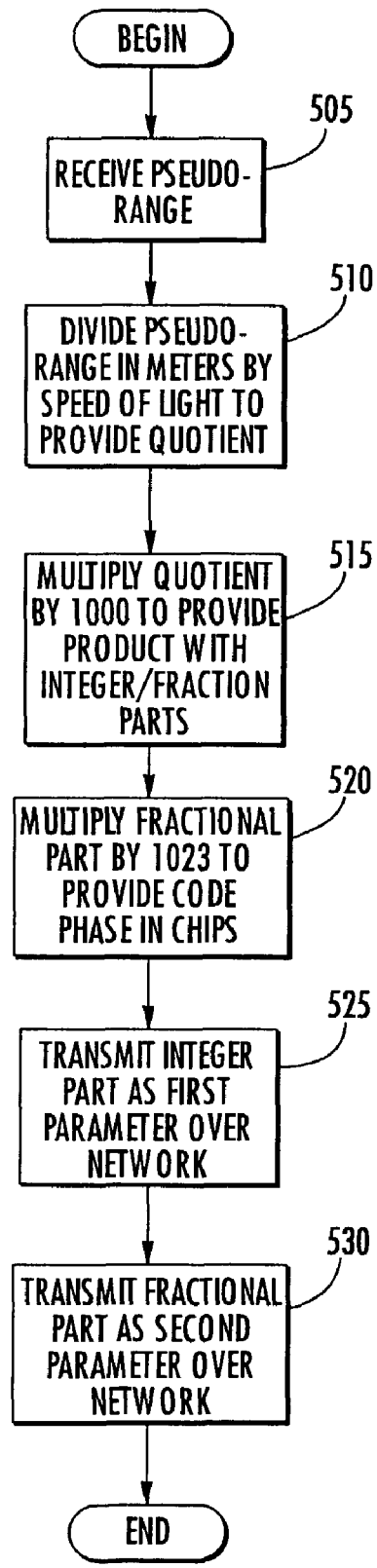
FIG. 5 is a flow chart illustrating operations for providing location determination information to an assisted location service according to further embodiments of the present invention.
Figure 6:
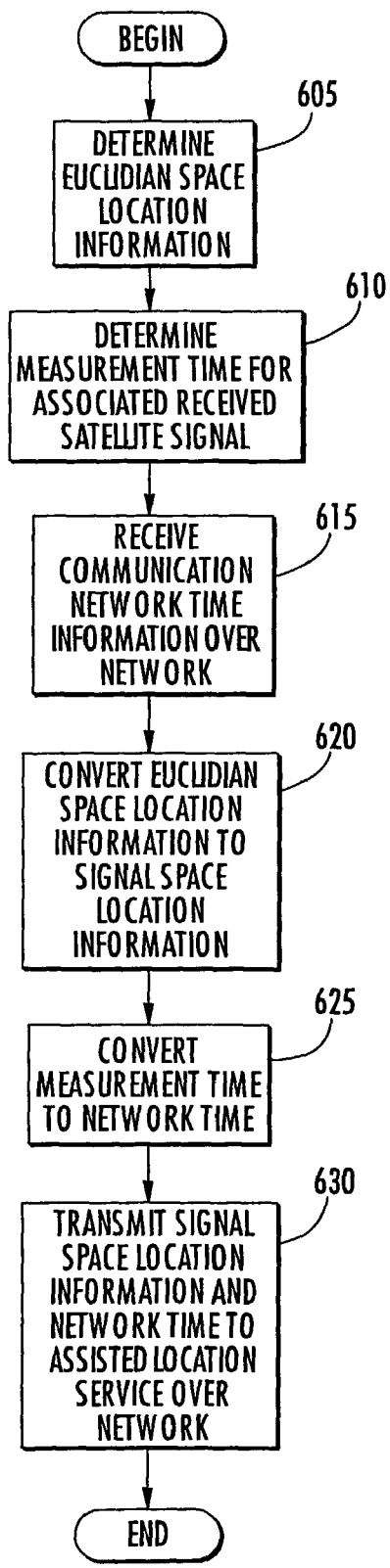
FIG. 6 is a flow chart illustrating operations for providing location determination information to an assisted location service according to yet further embodiments of the present invention.

FIGS. 4 through 6 are flowchart illustrations of operations that may be carried out by a mobile terminal 100 according to embodiments of the present invention. Operations related to determining the position of a mobile terminal according to embodiments of the present invention will now be described with reference to the flow chart diagram of FIG. 4. As shown in FIG. 4, operations begin at Block 405 when the conversion circuit 155 receives a set of first format location information based on measurements of signals transmitted from SPS satellites, which set of information is provided by a SPS receiver, such as the full function autonomous GPS receiver 160 illustrated in FIG. 3. As used herein, a "set" refers to one or more type of location information (such as a pseudo-range) for one or more satellites. The set of first format location information is converted to a second format, different from the first format, by the conversion circuit 155 to provide location determination information in a format suited for use by an assisted location service 36 associated with the wireless communication network 20 (Block 410). For example, in particular embodiments of the present invention, a set of first format location information includes Euclidian space location information for at least one of the SPS satellites and the Euclidian space location information is converted to signal space location information so as to be in the proper form for transmission to an assisted location service. The location determination information is then transmitted to the assisted location service 36 by the transmitter 150 over the wireless communication network 20 (Block 415).

Further embodiments of operations for providing location determination information to an assisted location service associated with wireless communication network will now be described with reference to the flow chart illustration of FIG. 5. As illustrated in FIG. 5, operations begin at Block 505 when the conversion circuit 155 receives pseudo-range data from the GPS receiver 160. The pseudo-range information will typically be provided in units of meters. Pseudo-range information to at least one of the positioning system satellites, and preferably four or more of the positioning system satellites, will be received by the conversion circuit 155. The pseudo-range, either received in units of meters or converted to units of meters for processing by the conversion circuit 155 is divided by the speed of light to provide a quotient (Block 510). The quotient is multiplied by 1000 to provide a product having an integer part and a fractional part (Block 515). The fractional part of the product is multiplied by 1023 to provide the code phase in chips (Block 520). Thus, operations at Block 520 will result in code phase information in chips for at least one and, preferably, four or more of the positioning system satellites.

While operations at Blocks 510 thru 520 have been described using constant values selected for pseudo-range data in meters, it will be understood that equivalent operations may be provided for pseudo-range data in other dimensions, including either English system measurements or metric measurements in different units, with changes to the constants used for the operations described above, while still remaining within the literal and/or equivalent scope of various embodiments of the present invention. Furthermore, while the operations at Blocks 510 through 520 have been described in specific terms for particular embodiments, it is the be understood, more generally, that the operations at Block 510 convert a range in Euclidian space units to a transit time in seconds (the quotient). Similarly, the operations at Block 515 convert the transit time in seconds to a transit time in milliseconds. Accordingly, the combined operations at Blocks 510 and 515 convert the pseudo-range to milliseconds of transit time. Operations at Block 520 the convert the fractional milliseconds to code phase (signal space units) based on characteristics of the C/A code of 1023 chips/millisecond. Stated differently, operations at Blocks 510 and 515 convert the pseudo-range to units of time related to the period of the code of the SPS satellite signals and operations at Block 520 convert the fractional part of the time unit into the phase of the code.

Operations as described at Block 505-520 above can generally be supported with an autonomous GPS receiver platform as autonomous GPS receivers generally are configured to provide as outputs: pseudo-range data, a GPS time stamp for the internal measurements resulting in the pseudo-range data, and received signal quality information for each acquired positioning system satellite. However, the raw internal code phase measurements are normally only available to the internal computing engine within the autonomous GPS receiver and are not available for transmission to an assisted location service 36 associated with the wireless communication network 20. Thus, the operations described at Blocks 505-520 provide for reconstruction of internal code phase measurements for transmission to a remote assisted location service, such as GPSOne compatible location service.

The pseudo-range measured at time t by the terminal $P_m$ is defined in Equation (1) below.

$$P_m = |x_s(t) - x_r(t)| - C(\Delta t_s(t) - \Delta t_r(t)) + \text{atmospheric delay} + \text{Receiver hw code delay} + \text{multi-path delay} + \text{Satellite hw code delay} + \epsilon \quad (1)$$

where:
t=measurement time
$|x_s(t) - x_r(t)| = P_r$=actual range (meters) from satellite to receiver at time t
$x_s(t)$=satellite position at time t (known)
$x_r(t)$=receiver position at time t (unknown)
$P_m$=measured pseudo-range
C=speed of light
$\Delta t_s(t)$=difference of satellite clock from actual GPS time at time t (known)
$\Delta t_r(t)$=difference of receiver clock from actual GPS time at time t (unknown)
atmospheric delay=excess delay through ionosphere and troposphere
Receiver hw code delay=signal delay through the GPS receiver hardware (unknown)
Satellite hw code delay=signal delay through the satellite transmitter (known)
Multi-path delay=delay due to multi-path propagation of the GPS signal (unknown)
$\epsilon$=error due to noise or modeling errors in satellite positioning or clock.

Note that the measured Pm is derived from code phase observed by the receiver at time t. Estimated pseudo-range is based on measured code phase, knowledge of satellite position and approximate knowledge of the receiver position and clock offset.

Note that autonomous GPS receivers suitable for use in various embodiments of the present invention need not compensate for all of the error sources indicated in Equation (1) and such information is provided solely for the purpose of furthering understanding rather than limiting the scope of the present invention. A model, for instance, of the atmospheric delay may be used to reduce the uncertainty of this term.

The measured pseudo-range data $P_m$ is generally available as an output from commercially available autonomous GPS receivers for each visible satellite ($P_{m,i}$) and is usually provided in Euclidian space coordinate units, more particularly, in meters (i.e., an estimated physical space distance between the GPS receiver and a respective satellite i). For many assisted location services implemented in support of E-911 requirements, such Euclidian space pseudo-range information is not usable as signal space information, such as satellite code phase and chips and fractions of chips, is used rather than a distance in meters for processing at the assisted location service based on the network protocols. For example, such signal space formatted data is specified by the TIA/EIA/IS-801-1 specification. Accordingly, the operations at Blocks 510-520 above described converting between pseudo-range and code phase according to Equation (2):

$$C_{m,i} = 1023 * [\text{Frac}(1000 * P_{m,i}/C)] \quad (2)$$

where $C_{m,i}$ is location determination information in the form of measured code phase for an ith SPS satellite.

Referring again to FIG. 5, the code phase location determination information is transmitted to the assisted location service including transmitting the integer part of the code phase as a first parameter (Block 525). The fraction part of the code phase, for the embodiments illustrated in FIG. 5, is transmitted as a second parameter over the wireless communication network (Block 530). For example, in embodiments conforming with the TIA/EIA/IS-801-1 specification, the integer part of $C_{m,i}$ may be sent to a server implementing the the assisted location service as parameter "SV_CODE_PH_WH." The fractional part of $C_{m,i}$ may be sent to the server as a parameter "SV_CODE_PH_FR."

Various embodiments in which measurement time information is also provided to the assisted location service will now be further described with reference to the flow chart illustration of FIG. 6. As shown in FIG. 6, operations begin at Block 605 by determining Euclidian space location information based on measurement of signals transmitted by SPS satellites. For example, the GPS receiver 160 of FIG. 3 may determine a pseudo-range to particular satellites based on received signals from the satellites, which information is provided to the conversion circuit 155. In addition, a measurement time is determined in SPS time for the received signals from SPS satellites (Block 610). For example, the GPS receiver 160 of FIG. 3 may output to the conversion circuit 155 a measurement time in GPS time for the respective pseudo-range data.

In particular embodiments illustrated in FIG. 6, the mobile terminal 100 also receives wireless communication network time information over the wireless communication network 20 (Block 615). For example, in various CDMA systems, CDMA system time equals GPS system time minus a number of leap seconds added to the Universal Time Clock (UTC) since Jan. 6, 1980 at 00:00:00, a parameter which will be referred to herein as "LP_SEC." The value of LP_SEC is generally transmitted to mobile terminals in the coverage area of the CDMA wireless communication network as timing information on a CDMA control channel (e.g., SYNC channel) and, thus, is available for use in calculating a CDMA system time based on GPS system time at the mobile terminal. The leap second information may also be obtained from navigation message information provided in the GPS satellite signal (UTC data), which information could be made available to the MT for use in computations.

The Euclidian space location information is converted to signal space location information, such as code phase in chips (Block 620). The measurement time in GPS time is converted to wireless communication network time based on the received wireless communication network time information or, alternatively, received from the GPS navigation message (Block 625). For some embodiments including the timing conversion described above, a measurement time based on CDMA system time, as required by various assisted location services, such as that specified by the TIA/EIA/IS-801-1 specification, may be generated even though the code phase $C_{m,i}$ is captured at a specific GPS system time and output as such by the autonomous GPS receiver 160. Thus, for such particular embodiments, the measurement time conversion operations at Block 625 may be expressed as shown in Equation (3)

$$\text{CDMA code phase measurement time} = \text{GPS code phase measurement time} - LP\_SEC \quad (3)$$

As illustrated in Block 630, the location determination information, including both the converted measurement time and the satellite signal based information is transmitted to the assisted location service 36 over the wireless communication network 20. In particular embodiments conforming with the requirements of the TIA/EIA/IS-801-1 specification, the converted measurement time expressed as a CDMA code phase measurement time may be transmitted as a parameter "TIME_REF." Thus, in accordance with various embodiments of the present invention, mobile terminals having rapid position acquisition capabilities based on inclusion of an autonomous GPS receiver (for example, an autonomous GPS receiver used to support applications such as vehicle or personal navigator environments requiring local position calculation) may be utilized in connection with various assisted location services meeting the requirements for E-911 as specified by governmental regulations without requiring changes to any position determining aspects associated with the assisted location service or with the wireless communications network while still avoiding the need to include a separate GPS receiver circuit specifically designed to support the requirements of the assisted location service.

The flowcharts, flow diagrams and block diagrams of FIGS. 3 through 6 illustrate the architecture, functionality, and operation of possible implementations of systems, methods and computer program products for providing location determination information to an assisted location service associated with a wireless communication network according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for providing location determination information to an assisted location service associated with a wireless communication network, the method comprising:

receiving a set of first format location information based on measurements of signals transmitted from positioning system satellites from a full function autonomous satellite positioning system (SPS) receiver, wherein the set of first format location information includes Euclidian space location information;

converting the set of first format location information to a second location reference format, different from the first format, external to the full function autonomous SPS receiver to provide the location determination information;

formatting the location determination information for transmission over the wireless communication network; and transmitting the location determination information to the assisted location service over the wireless communication network.

2. The method of claim 1 wherein the SPS receiver comprises a global positioning system (GPS) receiver and wherein the assisted location service comprises a TIA/EIA/IS-801-1 compatible service.

3. The method of claim 1 wherein converting the set of first format location information comprises converting the Euclidian space location information to signal space location information to provide the location determination information.

4. The method of claim 3 wherein the Euclidian space location information comprises a pseudo-range to at least one of the positioning system satellites and the signal space location information comprises a code phase in chips.

5. The method of claim 4 wherein the SPS receiver comprises a global positioning system (GPS) receiver that receives a GPS signal having an associated code and wherein converting the pseudo-range to a code phase in chips comprises:

converting the pseudo-range to units of time related to a period of the code to provide a code time; and converting a fractional part of the code time into a phase of the code in chips.

6. The method of claim 5 wherein the pseudo-range is in meters and wherein converting the pseudo-range to units of time comprises:

dividing the pseudo-range by the speed of light to provide a quotient;

multiplying the quotient by one thousand to provide a product having an integer part and a fractional part; and wherein converting a fractional part of the code time comprises multiplying the fractional part of the product by 1023 to provide the code phase in chips.

7. The method of claim 5 wherein the code phase in chips has an integer part and a fractional part and wherein transmitting the location determination information comprises transmitting the integer part of the code phase as a first parameter and the fractional part of the code phase as a second parameter over the wireless communication network.

8. The method of claim 5 further comprising:

determining a measurement time in SPS time for a received signal from at least one of the positioning system satellites; and converting the measurement time in SPS time to wireless communication network time to provide the location determination information.

9. The method of claim 8 further comprising receiving wireless communication network time information over the wireless communication network and wherein converting the measurement time information comprises converting the measurement time in SPS time to wireless communication network time based on the received wireless communication network time information.

10. The method of claim 9 wherein the wireless communication network comprises a code division multiple access (CDMA) system and wherein converting the measurement time in SPS time to wireless communication network time to provide the location determination information comprises subtracting a number of leap seconds added to a universal time clock since a reference time from GPS system time.

11. The method of claim 8 further comprising receiving universal time clock time information from at least one of the positioning system satellites and wherein converting the measurement time information comprises converting the measurement time in SPS time to wireless communication network time based on the received universal time clock time information.

12. The method of claim 1 wherein receiving a set of first format location information includes determining a measurement time in SPS time for received signal from at least one of the positioning system satellites and wherein converting the set of first format location information includes converting the measurement time in SPS time to wireless communication network time to provide the location determination information.

13. The method of claim 12 wherein the SPS comprises a global positioning system (GPS) and wherein the method further comprises receiving wireless communication network time information over the wireless communication network and wherein converting the measurement time information comprises converting the measurement time in GPS time to wireless communication network time based on the received wireless communication network time information.

14. The method of claim 13 wherein the wireless communication network comprises a code division multiple access (CDMA) system and wherein the received wireless communication network time information comprises a number of leap seconds added to a universal time clock since a reference time and wherein converting the measurement time in SPS time to wireless communication network time to provide the location determination information comprises subtracting the number of leap seconds from GPS time.

15. A method for providing location determination information to an assisted location service associated with a wireless communication network, the method comprising:
determining Euclidian space location information based on measurements of signals transmitted from positioning system satellites;
converting the Euclidian space location information to signal space location information to provide the location determination information; and
transmitting the location determination information to the assisted location service over the wireless communication network.

16. The method of claim 15 wherein the positioning system satellites comprise global positioning system (GPS) satellites and wherein the assisted location service comprises a TIA/EIA/IS-801-1 compatible service.

17. The method of claim 15 wherein the Euclidian space location information comprises a pseudo-range to at least one of the positioning system satellites and the signal space location information comprises a code phase in chips.

18. The method of claim 17 wherein the SPS receiver comprises a global positioning system (GPS) receiver that receives a GPS signal having an associated code and wherein converting the pseudo-range to a code phase in chips comprises:
converting the pseudo-range to units of time related to a period of the code to provide a code time; and
converting a fractional part of the code time into a phase of the code in chips.

19. The method of claim 18 wherein the pseudo-range is in meters and wherein converting the pseudo-range to units of time comprises:
dividing the pseudo-range by the speed of light to provide a quotient;
multiplying the quotient by one thousand to provide a product having an integer part and a fractional part; and
wherein converting a fractional part of the code time comprises multiplying the fractional part of the product by 1023 to provide the code phase in chips.

20. The method of claim 18 wherein the code phase in chips has an integer part and a fractional part and wherein transmitting the location determination information comprises transmitting the integer part of the code phase as a first parameter and the fractional part of the code phase as a second parameter over the wireless communication network.

21. The method of claim 18 further comprising:
determining a measurement time in satellite positioning system (SPS) time for a received signal from at least one of the positioning system satellites; and
converting the measurement time in SPS time to wireless communication network time to provide the location determination information.

22. The method of claim 21 further comprising receiving wireless communication network time information over the wireless communication network and wherein converting the measurement time information comprises converting the measurement time in SPS time to wireless communication network time based on the received wireless communication network time information.

23. The method of claim 22 wherein the wireless communication network comprises a code division multiple access (CDMA) system and wherein converting the measurement time in SPS time to wireless communication network time to provide the location determination information comprises subtracting a number of leap seconds added to a universal time clock since a reference time from GPS system time.

24. The method of claim 21 further comprising receiving universal time clock time information from at least one of the positioning system satellites and wherein converting the measurement time information comprises converting the measurement time in SPS time to wireless communication network time based on the received universal time clock time information.

25. A system for providing location determination information to an assisted location service associated with a wireless communication network, the system comprising:
a full function autonomous satellite positioning system (SPS) receiver that generates a set of first format location information based on measurements of signals transmitted from positioning system satellites, wherein the set of first format location information includes Euclidian space location information;
a conversion circuit separate from the SPS receiver that is configured to receive the set of first format location information from the SPS receiver and to convert the set of first format location information to a second location reference format, different from the first format to provide the location determination information; and
a transmitter configured to format the location determination information for transmission over the wireless communication network and to transmit the location determination information to the assisted location service over the wireless communication network.

26. The system of claim 25 wherein the SPS receiver comprises a full function autonomous global positioning system (GPS) receiver and wherein the assisted location service comprises a TIA/EIA/IS-801-1 compatible service.

27. The system of claim 25 wherein the conversion circuit is configured to convert the Euclidian space location information to signal space location information to provide the location determination information.

28. The system of claim 27 wherein the Euclidian space location information comprises a pseudo-range to at least one of the positioning system satellites and the signal space location information comprises a code phase in chips, wherein the SPS receiver comprises a global positioning system (GPS) receiver that is configured to receive a GPS signal having an associated code, and wherein the conversion circuit is configured to convert the pseudo-range to units of time related to a period of the code to provide a code time and convert a fractional part of the code time into a phase of the code in chips.

29. A mobile terminal including the system of claim 28.

30. The system of claim 28 wherein the satellite positioning receiver is configured to determine a measurement time in SPS time for a received signal from at least one of the positioning system satellites and wherein the conversion circuit is configured to convert the measurement time in SPS time to wireless communication network time to provide the location determination information.

31. The system of claim 30 further comprising a receiver that receives wireless communication network time information over the wireless communication network and wherein the conversion circuit is configured to convert the measurement time in SPS time to wireless communication network time based on received wireless communication network time information.

32. A mobile terminal including the system of claim 31.

33. The system of claim 25 further comprising a wireless communication network receiver that receives wireless communication network time information over the wireless communication network and wherein the conversion circuit is configured to convert the measurement time in SPS time to wireless communication network time based on received wireless communication network time information.

34. The system of claim 33 wherein the SPS receiver comprises a global positioning system (GPS) receiver and wherein the wireless communication network comprises a code division multiple access (CDMA) system and wherein the received wireless communication network time information comprises a number of leap seconds added to a universal time clock since a reference time and wherein the conversion circuit is configured to subtract the number of leap seconds from GPS time to provide the location determination information.

35. A mobile terminal including the system of claim 25.

36. A system for providing location determination information to an assisted location service associated with a wireless communication network, the system comprising:

means for receiving a set of first format location information based on measurements of signals transmitted from positioning system satellites from a full function autonomous satellite positioning system (SPS) receiver, wherein the set of first format location information includes Euclidian space location information;

means for converting the set of first format location information to a second location reference format, different from the first format, external to the full function autonomous SPS receiver to provide the location determination information; and means for formatting the location determination information for transmission over the wireless communication network and for transmitting the location determination information to the assisted location service over the wireless communication network.

37. A mobile terminal including the system of claim 36.

38. A system for providing location determination information to an assisted location service associated with a wireless communication network, the system comprising:

means for determining Euclidian space location information based on measurements of signals transmitted from positioning system satellites;

means for converting the Euclidian space location information to signal space location information to provide the location determination information; and means for transmitting the location determination information to the assisted location service over the wireless communication network.

39. A mobile terminal including the system of claim 38.

40. A computer program product for providing location determination information to an assisted location service associated with a wireless communication network, the computer program product comprising:

a computer-readable storage medium having computer-readable program code embodied in said medium, said computer-readable program code comprising:

computer-readable program code that receives a set of first format location information based on measurements of signals transmitted from positioning system satellites from a full function autonomous satellite positioning system (SPS) receiver, wherein the set of first format location information includes Euclidian space location information;

computer-readable program code that converts the set of first format location information to a second location reference format, different from the first format, external to the full function autonomous SPS receiver to provide the location determination information; and computer-readable program code that formats the location assistance information for transmission over the wireless communication network and transmits the location determination information to the assisted location service over the wireless communication network.

41. A computer program product for providing location determination information to an assisted location service associated with a wireless communication network, the computer program product comprising:

a computer-readable storage medium having computer-readable program code embodied in said medium, said computer-readable program code comprising:

computer-readable program code that determines Euclidian space location information based on measurements of signals transmitted from positioning system satellites;

computer-readable program code that converts the Euclidian space location information to signal space location information to provide the location determination information; and computer-readable program code that transmits the location determination information to the assisted location service over the wireless communication network.

42. A method for providing location determination information to an assisted location service, the method comprising:

receiving a set of first format location information based on measurements of signals transmitted from positioning system satellites from a full function autonomous satellite positioning system (SPS) receiver, wherein the set of first format location information includes Euclidian space location information;

converting the set of first format location information to a second location reference format, different from the first format, external to the full function autonomous SPS receiver to provide the location determination information;

formatting the location determination information for transmission over a wireless link; and transmitting the location determination information to the assisted location service over the wireless link.

43. The method of claim 42 wherein the SPS receiver comprises a global positioning system (GPS) receiver and wherein the assisted location service comprises a TIA/EIA/IS-801-1 compatible service.

44. The method of claim 43 wherein the set of first format location information includes Euclidian space location information comprising a pseudo-range to at least one of the positioning system satellites and wherein the second location reference format includes signal space location information comprising a code phase in chips, wherein the SPS receiver comprises a global positioning system (GPS) receiver that receives a GPS signal having an associated code, and wherein converting the pseudo-range to a code phase in chips comprises:

converting the pseudo-range to units of time related to a period of the code to provide a code time; and converting a fractional part of the code time into a phase of the code in chips.

45. A method for providing location determination information to an assisted location service, the method comprising:

determining Euclidian space location information based on measurements of signals transmitted from positioning system satellites;

converting the Euclidian space location information to signal space location information to provide the location determination information; and transmitting the location determination information to the assisted location service over a wireless link.

46. The method of claim 45 wherein the positioning system satellites comprise global positioning system (GPS) satellites and wherein the assisted location service comprises a TIA/EIA/IS-801-1 compatible service.

47. The method of claim 45 wherein the Euclidian space location information comprises a pseudo-range to at least one of the positioning system satellites and the signal space location information comprises a code phase in chips, and wherein converting the pseudo-range to a code phase in chips comprises:

converting the pseudo-range to units of time related to a period of the code to provide a code time; and converting a fractional part of the code time into a phase of the code in chips.

48. A system for providing location determination information to an assisted location service, the system comprising:

a full function autonomous satellite positioning system (SPS) receiver that generates a set of first format location information based on measurements of signals transmitted from positioning system satellites, wherein the set of first format location information includes Euclidian space location information;

a conversion circuit separate from the SPS receiver that is configured to receive the set of first format location information from the SPS receiver and to convert the set of first format location information to a second location reference format, different from the first format to provide the location determination information; and a transmitter configured to format the location determination information for transmission over a wireless link and to transmit the location determination information to the assisted location service over the wireless link.

49. The system of claim 48 wherein the SPS receiver comprises a full function autonomous global positioning system (GPS) receiver and wherein the assisted location service comprises a TIA/EIA/IS-801-1 compatible service.

50. The system of claim 48 wherein the second location reference format comprises signal space location information.

51. A mobile terminal including the system of claim 50.

52. A system for providing location determination information to an assisted location service, the system comprising:

means for receiving a set of first format location information based on measurements of signals transmitted from positioning system satellites from a full function autonomous satellite positioning system (SPS) receiver, wherein the set of first format location information includes Euclidian space location information;

means for converting the set of first format location information to a second location reference format, different from the first format, external to the full function autonomous SPS receiver to provide the location determination information; and means for formatting the location determination information for transmission over a wireless link and for transmitting the location determination information to the assisted location service over the wireless link.

53. A mobile terminal including the system of claim 52.

54. A system for providing location determination information to an assisted location service, the system comprising:

means for determining Euclidian space location information based on measurements of signals transmitted from positioning system satellites;

means for converting the Euclidian space location information to signal space location information to provide the location determination information; and means for transmitting the location determination information to the assisted location service over a wireless link.

55. A mobile terminal including the system of claim 54.

56. A computer program product for providing location determination information to an assisted location service, the computer program product comprising:

a computer-readable storage medium having computer-readable program code embodied in said medium, said computer-readable program code comprising:

computer-readable program code that receives a set of first format location information based on measurements of signals transmitted from positioning system satellites from a full function autonomous satellite positioning system (SPS) receiver, wherein the set of first format location information includes Euclidian space location information;

computer-readable program code that converts the set of first format location information to a second location reference format, different from the first format, external to the full function autonomous SPS receiver to provide the location determination information; and computer-readable program code that formats the location determination information for transmission over a wireless link and transmits the location determination information to the assisted location service over the wireless link.

57. A computer program product for providing location determination information to an assisted location service, the computer program product comprising:

a computer-readable storage medium having computer-readable program code embodied in said medium, said computer-readable program code comprising:

computer-readable program code that determines Euclidian space location information based on measurements of signals transmitted from positioning system satellites;

computer-readable program code that converts the Euclidian space location information to signal space location information to provide the location determination information; and computer-readable program code that transmits the location determination information to the assisted location service over a wireless link.

* * * * *

UNITED STATES PATENT AND TRADEMARK OFFICE
CERTIFICATE OF CORRECTION

| | |
|---|---|
| PATENT NO. | : 8,010,124 B2 |
| APPLICATION NO. | : 10/395838 |
| DATED | : August 30, 2011 |
| INVENTOR(S) | : Osborn et al. |

Page 1 of 1

It is certified that error appears in the above-identified patent and that said Letters Patent is hereby corrected as shown below:

On the Title Page:
Item (56)

Please add the following:
-- EP 1203965 A2   5/2000
JP 2002-303665   10/2002
JP 11-008583   01/1999
JP 7-294624   11/1995
WO 95/17686   6/1995 --

Other Publications:
Please add -- Japanese Office Action corresponding to Japanese Application No. 2006-506256; Dated: July 31, 2009. --

Column 11, Line 35, Equation 1: Please correct "+∈" to read -- +ε --
Line 56, Please correct "∈=" to read -- ε= --

Signed and Sealed this
Twenty-fourth Day of April, 2012

David J. Kappos
*Director of the United States Patent and Trademark Office*